United States Patent
Ahlert et al.

(10) Patent No.: US 6,354,393 B1
(45) Date of Patent: Mar. 12, 2002

(54) HYDRAULIC POWER STEERING SYSTEM FOR MOTOR VEHICLES

(75) Inventors: Günter Ahlert, Kongen; Detlef Beckmann, Baltmannsweiler; Thomas Kind, Stuttgart; Thomas Maier, Copenhagen; Martin Rothmund, Weil der Stadt; Wolfram Thomas, WInnenden; Jurgen Trost, Grafenberg; Gert Volk, Stuttgart, all of (DE)

(73) Assignees: Daimler-Chrysler AG, Stuttgart; Mercedes-Benz Lenkungen GmbH, Duesseldorf, both of (DE)

(*) Notice: Subject to any disclaimer, the term of this patent is extended or adjusted under 35 U.S.C. 154(b) by 0 days.

(21) Appl. No.: 09/451,835

(22) Filed: Dec. 1, 1999

(30) Foreign Application Priority Data

Dec. 1, 1998 (DE) .......................................... 198 55 404

(51) Int. Cl.[7] .............................................. B62D 5/06
(52) U.S. Cl. ...................................... 180/403; 180/406
(58) Field of Search ............................. 180/402, 403, 180/404, 405, 406

(56) References Cited

U.S. PATENT DOCUMENTS

| | | | |
|---|---|---|---|
| 4,237,993 A | * 12/1980 | Jablonsky | 180/406 |
| 5,251,716 A | * 10/1993 | Pedersen | 180/406 |
| 5,826,676 A | * 10/1998 | Ko | 180/403 |
| 5,862,878 A | * 1/1999 | Bohner et al. | 180/403 |
| 6,102,150 A | * 8/2000 | Bohner et al. | 180/403 |

FOREIGN PATENT DOCUMENTS

| | | |
|---|---|---|
| DE | 196 27 893 C1 | 7/1996 |
| JP | 63-34683 | 3/1988 |
| JP | 6-501662 | 2/1994 |
| WO | WO 92/06880 | 4/1992 |
| WO | WO 97/39935 | 10/1997 |

* cited by examiner

*Primary Examiner*—Kevin Hurley
(74) *Attorney, Agent, or Firm*—Crowell & Moring LLP

(57) ABSTRACT

A hydraulic power steering system for non-tracked vehicles, particularly motor vehicles, has a steering adjustment of the steered vehicle wheels which takes place of a hydraulic actuating assembly which can be connected by a change-over valve with one respectively of two or several hydraulic circuits. In normal operation, the circuits operate in parallel and functionally in the same direction so that, in the event of a disturbance, a change-over can take place to another hydraulic circuit without any interruption. For controlling the actuating assembly, each hydraulic circuit comprises a servo valve which is operated as a function of a desired-actual value comparison of the steering angle by a control and automatic control device, which is connected with an actual steering angle value generator operated by the steered vehicle wheels and a desired steering angle value generator controlled by way of the steering handle operated on the driver side.

11 Claims, 2 Drawing Sheets

HYDRAULIC POWER STEERING SYSTEM FOR MOTOR VEHICLES

BACKGROUND AND OF THE INVENTION

This application claims priority of DE 198 55 404.4-21, filed Dec. 1, 1998, the disclosure of which is expressly incorporated by reference herein.

The present invention relates to a hydraulic power steering system for non-tracked vehicles, particularly motor vehicles, having a steering handle, such as a manual steering wheel, operated on the driver side and a double-acting hydraulic servo motor (steering actuator) positively coupled with steered vehicle wheels for their steering adjustment, A motor-operated, particularly electrically operated servo valve arrangement is connected by a pressure connection with the delivery side of a hydraulic pump, by way of a low-pressure connection with the suction side of the hydraulic pump or a hydraulic reservoir communicating with the suction side and, by way of two motor connections, with the two sides of the servo motor. When the pump is operating, the control of a pressure difference between the motor connections with respect to the extent and the direction is permitted. An electronic automatic control arrangement has a desired steering angle value generator operated by the steering handle as well as an actual steering angle value generator operated by the steered vehicle wheels and controls the servo valve as a function of a desired-actual value comparison.

In hydraulic power steering systems currently used in motor vehicles, a manual steering wheel and the steered vehicle wheels are mechanically positively coupled with one another. Typically, a double-acting piston-cylinder unit is used as the servo motor. As a function of forces and moments effective between the manual steering wheel and the steered vehicle wheels, the servo motor is controlled such that only limited forces must be applied to the manual steering wheel by the driver. The positive coupling between the manual steering wheel and the steered vehicle wheels comprises two parts which can be moved relative to one another and whose relative movements with respect to the extent and direction are analogous to the forces and moments effective between the manual steering wheel and the steered vehicle wheels. These relative movements are transmitted to a servo valve controlling the servo motor. Thereby, servo forces can be generated which are analogous to the forces and moments effective between the manual steering wheel and the steered vehicle wheels.

In addition, steering systems are currently contemplated for normal road vehicles in the case of which any mechanical positive coupling between the steering handle or manual steering wheel and the steered vehicle wheels is absent. On the contrary, the steering handle or manual steering wheel and the steered vehicle wheels in the normal operation are coupled with one another by a control system only with respect to the effect, in which case the steering handle or manual steering wheel operates a desired-value generator for the respective desired steering angle which is then adjusted by the control system at the steered vehicle wheels with which an actual steering angle value generator is associated.

In this case, the control system may take additional parameters into account and can change, for example, the transmission ratio between the adjusting or rotating stroke of the steering handle or manual steering wheel and the steering angle change of the steered vehicle wheels as a function of the vehicle speed. In addition, if required, a steering against swerving motions of the vehicle and cross wind influences can automatically take place before the driver is capable of carrying out a suitable steering correction.

DE 196 27 893 C1 discloses a steering system in which, in normal operation, no positive coupling exists between the steering handle and the steered vehicle wheels. For emergency purposes, a hydraulic coupling is provided between the steering handle and the steered vehicle wheels which is normally switched to free wheeling. This hydraulic coupling is automatically switched to be operative as soon as a defect is detected in the electronically controlled main system which operates without a positive coupling between the steering handle and the steered vehicle wheels. Such steering systems thus implement the "steer by wire" concept.

SUMMARY OF THE INVENTION

An object of the present invention is to provide a construction which is advantageous for a "steer by wire" purpose.

According to the invention, this object has been achieved in that, forming two or several parallel hydraulic circuits, the servo valve arrangement as well as the pump are arranged twice or several times. A change-over valve arrangement between the hydraulic circuits and the servo motor connects in any of its positions in each case a different hydraulic circuit with the servo motor and shuts off the other hydraulic circuits with respect to the servo motor. An electronic monitoring device combined with a sensor system for detecting operating parameters of the hydraulic circuits and/or with the automatic control arrangement, in the event of disturbances in the hydraulic circuit connected with the servo motor and/or in the control system of the control arrangement assigned to this hydraulic circuit, triggers the change-over valve arrangement in order to connect an undisturbed hydraulic circuit or a hydraulic circuit with an undisturbed control system with the servo motor.

The present invention is based on the recognition of providing at least two equivalent parallel hydraulic circuits which are controlled and monitored separately from one another, of which, however, only one is effectively connected with the servo motor. In the event of a disturbance, the servo motor can then be connected with a fully operable hydraulic circuit, in which case no concern about a noticeable change of the operating behavior of the steering system. That is, the hydraulic circuit, which now communicates with the servo motor notwithstanding its separation from the servo motor, has carried out all operating steps required for controlling the servo motor. During the change-over of the change-over valve, the respective subsequent hydraulic circuit therefore takes over, without any interruption, the work of the hydraulic circuit previously connected with the servo motor.

According to a currently contemplated particularly preferred embodiment of the present invention, the servo motor and the change-over valve form a constructional unit such that no leakages can occur between the servomotor and the change-over valve. Furthermore, all parts of the hydraulic systems can advantageously be under a certain excess pressure. As a result, air can be securely prevented from penetrating into the hydraulic system.

It this context, it may be advantageous to construct each hydraulic reservoir as a low-pressure reservoir, so that a hydraulic prestressing is ensured also on the suction side of the hydraulic pumps.

If it is ensured that the pumps can take in no air, it can optionally also be provided to keep each hydraulic reservoir without pressure and to arrange a throttle in the return lines leading from the servo valves back to the reservoir. Thereby, during the operation of the pump, a minimum pressure occurs on the input side of this throttle and thus at all connections of the servo valve.

BRIEF DESCRIPTION OF THE DRAWINGS

Other objects, advantages and novel features of the present invention will become apparent from the following detailed description of the invention when considered in conjunction with the accompanying drawings

DETAILED DESCRIPTION OF THE DRAWINGS

Figure 1:
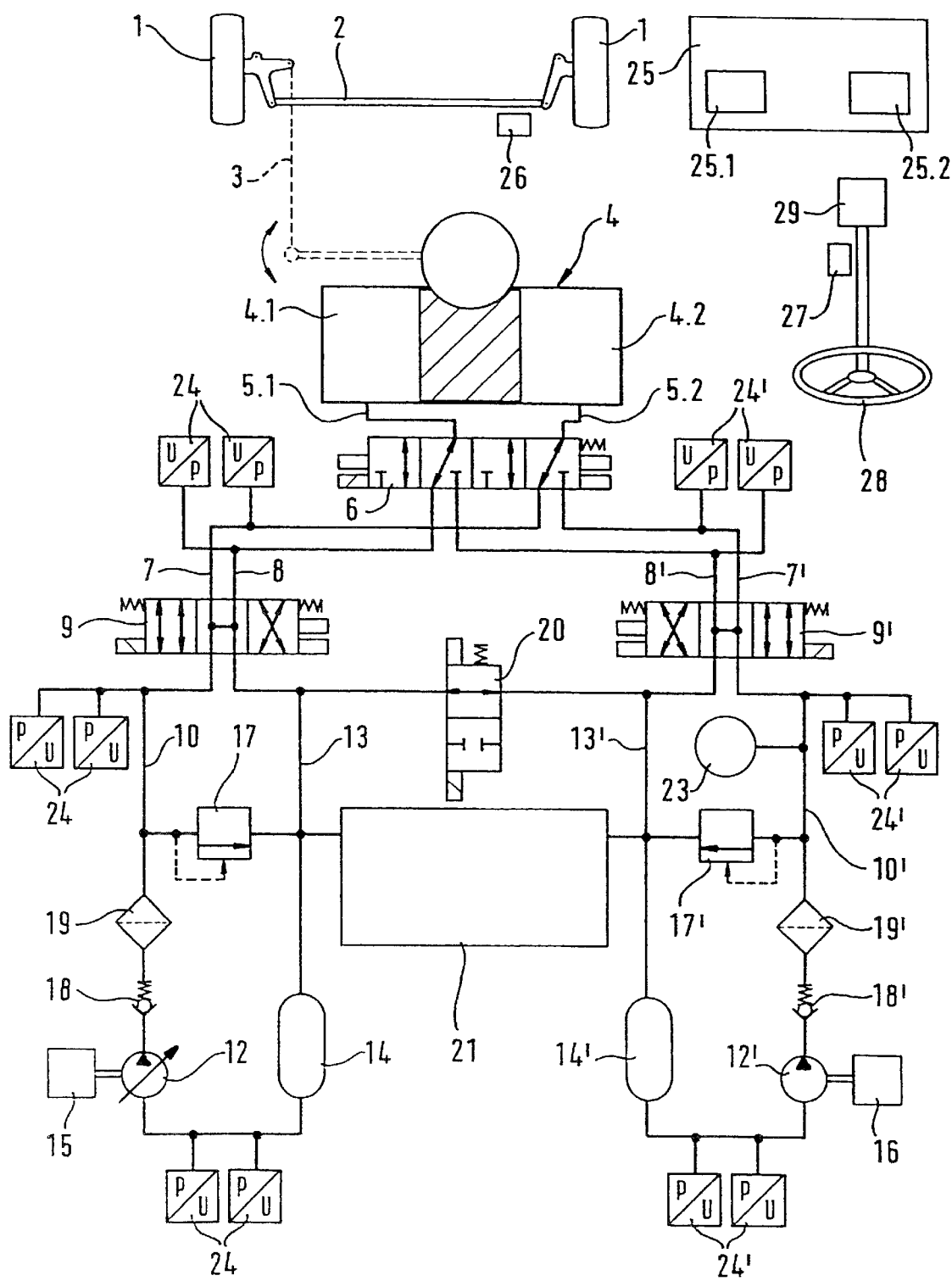
FIG. 1 is a schematic representation of a first embodiment of the invention.

According to FIG. 1, a motor vehicle has two steerable vehicle wheels 1 which, in a basically known manner, are coupled with one another by a tie rod 2 and are connected by a steering linkage 3 with a double-acting hydrostatic servo motor 4 such that a steering angle change of the steered vehicle wheels 1 is always connected with a corresponding stroke of the servo motor. The servo motor 4 is a double-acting piston-cylinder unit with hydraulic chambers 4.1 and 4.2 arranged on both sides of a piston.

The two hydraulic chambers 4.1, 4.2 are connected by respective lines 5.1, 5.2 with a directional control or change-over valve 6 which can be changed over between two positions and connects the above-mentioned lines 5.1, 5.2 either with motor connections 7, 8 of a servo valve 9 with an open center or with motor connections 7', 8' of a servo valve 9' also operating with an open center. The pressure connections of the servo valves 9, 9' are connected by pressure lines 10, 10' with the delivery side of respective pumps 12, 12'. The return flow connections of the servo valves 9, 9' lead by way of respective low-pressure lines 13, 13' into a reservoir 14, 14' respectively to which the suction side of the respective pump 12, 12' is also connected. The servo motor 4 and the change-over valve 6 together form a constructional unit (schematically shown by dashed lines in FIG. 1) which excludes leakage.

The servo motor 4 and the change-over valve 6 together form a sealed constructional unit (schematically shown by dashed lines in FIG. 1) which excludes leakage.

The pumps 12, 12' are driven in different manners. The pump 12' can, for example, be driven by a preferably controllable electric motor 16, while the pump 12 can be connected with respect to the drive with parts of a drive train 15 of the vehicle, for example, with driven vehicle wheels, and therefore operates as long as the vehicle is moving. Because constantly changing rotational speeds may occur in the drive train 15, i.e., an uncontrolled drive the pump 12 can optionally be constructed as a controllable pump for the compensation of the changing rotational speeds, as illustrated in the manner of an example for the pump 12.

One respective pressure control valve 17, 17' is arranged between the pressure line 10, 10' and the low-pressure line 13, 13'. In addition, a return valve 18, and 18' can be arranged in the respective pressure line 10, 10' in each case in front of the inlet of the associated pressure control valve 17, 17', through which return valve 18, 18', a return flow is prevented in the respective pressure line 10, 10'. In addition, a filter arrangement 19, 19' respectively is provided on the delivery side of the pump 12, 12'.

The two low-pressure lines 13, 13' can be connected with one another or shut-off from one another by way of a shut-off valve 20. In addition, a charging device 21 is associated with the two low-pressure lines 13, 13', whereby the low-pressure lines 13, 13' can be brought to a defined excess pressure, which is low in comparison to the possible pressure on the delivery side of the pumps 12, 12'. Because of the arrangement of the charging device 21, the reservoirs 14, 14' are also under a corresponding excess pressure. For this reason, each reservoir 14, 14' is constructed as a low-pressure reservoir. Optionally, one pressure accumulator respectively can be provided on the delivery side of the pumps 12, 12'. In FIG. 1, such a pressure accumulator 23 is assigned only to the pressure line 10'.

A plurality of pressure sensors 24, 24', detect hydraulic pressures at different sections of the hydraulic systems. On the input side, a control and automatic control arrangement 25 is connected with at least one actual steering angle value generator 26, which is operated, for example, by way of tie rod 2 corresponding to the steering adjustment of the wheels 1, as well as with at least one desired steering angle value generator 27 which is operated on the driver side by way of a manual steering wheel 28.

Furthermore, the manual steering wheel 28 is coupled with respect to the drive with a manual force actuator 29 which can be formed, for example, by a non-self-locking electric motor which, in turn, is controlled by the control and automatic control arrangement 25. During normal operation, the change-over valve 6 is changed over against the force of its restoring spring by the corresponding energization of its operating magnets by the control and automatic control arrangement 25 into its other position as will be understood by one skilled in the art, and is held in this position. Thus, the hydraulic chamber 4.1 is connected with the motor line 8' and the hydraulic chamber 4.2 is connected with the motor line 7'. The motor lines 7, 8 are shut off toward the servo motor 4.

By operating the manual steering wheel 28, the driver defines a desired steering angle value, by way of a desired steering angle value generator 27 controlled thereby. The control and automatic control arrangement 25 compares this desired value with the actual steering angle value supplied by the actual steering angle value generator 26 and, as a function of the desired-actual value comparison of the steering angle, controls the servo valves 9 and 9', specifically in parallel and functionally in the same direction. Thereby, between the motor lines 7, 8, on one hand, and 7', 8', on the other hand, pressure differences occur in the same direction which are similar at least with respect to their magnitude.

These pressure differences can be detected with respect to the extent and direction by the pressure sensors 24, 24' assigned to the respective motor lines 7, 8 as well as the motor lines 7', 8'. As a result, the control and automatic control arrangement 25, if required, can adjust the servo valve 9, whose motor lines 7, 8 are shut off toward the servo motor 4 by the change-over valve 6. Consequently, such that the pressure difference between the motor lines 7, 8 is largely adapted to the pressure difference between the motor lines 7', 8' which are connected with the servo motor 4 by the change-over valve 6.

The pressure difference between the motor lines 7', 8' also exists between the hydraulic chambers 4.1, 4.2 of the servo motor 4 and causes a corresponding actuating force. On the basis of the desired-actual value comparison of the steering angle via the control and automatic control arrangement 25 and the thus caused controlling of the servo valve 9', the servo motor 4 therefore generates an actuating force in an actuating direction reducing the desired-actual value difference. This actuating force increases with an increasing desired-actual value difference. As a result, the steering movement of the steered vehicle wheels 1 follows the adjustment of the manual steering wheel toward the right or the left.

Simultaneously, a manual force can be felt at the manual steering wheel 28 which is generated by the manual force actuator 29 and which is correlated with the actuating forces of the servomotor 4 with respect to extent and direction. For this purpose, the manual force actuator 29 can be controlled by the control and automatic control arrangement 25 in correlation with the pressure differences existing between the chambers 4.1, 4.2. These pressure differences are determined by the pressure sensors 24' at the motor lines 7', 8'.

The control and automatic control arrangement 25 has a multiple-redundancy construction and particularly has separate control systems 25.1, 25.2 for controlling the servo valves 9, 9'. Furthermore, the control and automatic control arrangement 25 is constructed as a monitoring device or is combined with a monitoring device which analyzes the signals of all pressure sensors 24, 24'. Additional sensors (not shown) can be provided to detect the positions of the servo valves 9, 9' or the function of other elements. As an alternative (or in addition), the position of the servo valves 9, 9' can also be determined by the detection of the electric control currents of the operating magnets of these valves.

Should it now be determined that, in the hydraulic circuit of the servo valve 9', its motor lines 7', 8' are connected by the change-over valve 6 with the servo motor 4, and/or a defect has occurred in the control system 25.2 assigned to this servo valve 9', the electric current for the operating magnets of the change-over valve 6 is switched off. Consequently, the change-over system 6 takes up the position illustrated in FIG. 1. As a result, the motor lines 7, 8 of the servo valve 9 are now connected with the servo motor 4. Subsequently, the actuating force of the servomotor 4 is controlled by the control and automatic control arrangement 25 by the operation of the servo valve 9.

Because the hydraulic circuit assigned to the servo valve 9 operates also during normal operation, and correspondingly, a pressure difference always exists at the motor lines 7, 8 which is analogous with the pressure difference at the motor lines 7', 8', as long as normal operation exists, the control of the servo motor 4 during the change-over of the change-over valve 6 can take place without delay by way of the servo valve 9 which subsequently is operated exclusively in correlation with the desired-actual value deviation of the steering angle.

In the normal operation, the pressure lines 10, 10' are held under pressure by the respective pumps 12, 12', and the low-pressure lines 13, 13' are subjected to excess pressure by the charging device 21 before the vehicle is driven, consequently all connections of the servo valves 9, 9' are constantly under excess pressure with the result that no vacuum occurs in the servo motor 4 and penetration of air into the servo motor 4 can reliably be avoided. By monitoring the excess pressure during the drive, leakages can be recognized.

The charging device 21 can optionally be eliminated and instead it can be provided that the entire hydraulic system be pressurized once before the start of the operation. As long as the resulting excess pressure is maintained in the system, there will be no leakages.

Because of unavoidable leakages between the connections of the change-over valve 6, a very slight parasitic coupling will occur during the operation between the hydraulic circuit of the servo valve 9 and the hydraulic circuit of the servo valve 9'. In order to avoid that, as the result, different filling quantities will occur in the reservoirs 14, 14' over time, the shut-off valve 20 can be opened from time to time or can be kept open permanently in the normal operation. Thereby, an exchange of hydraulic medium is permitted between the two reservoirs 14, 14'. Should a leakage be detected in a hydraulic circuit, however, the shut-off valve 20 will be closed.

Figure 2:
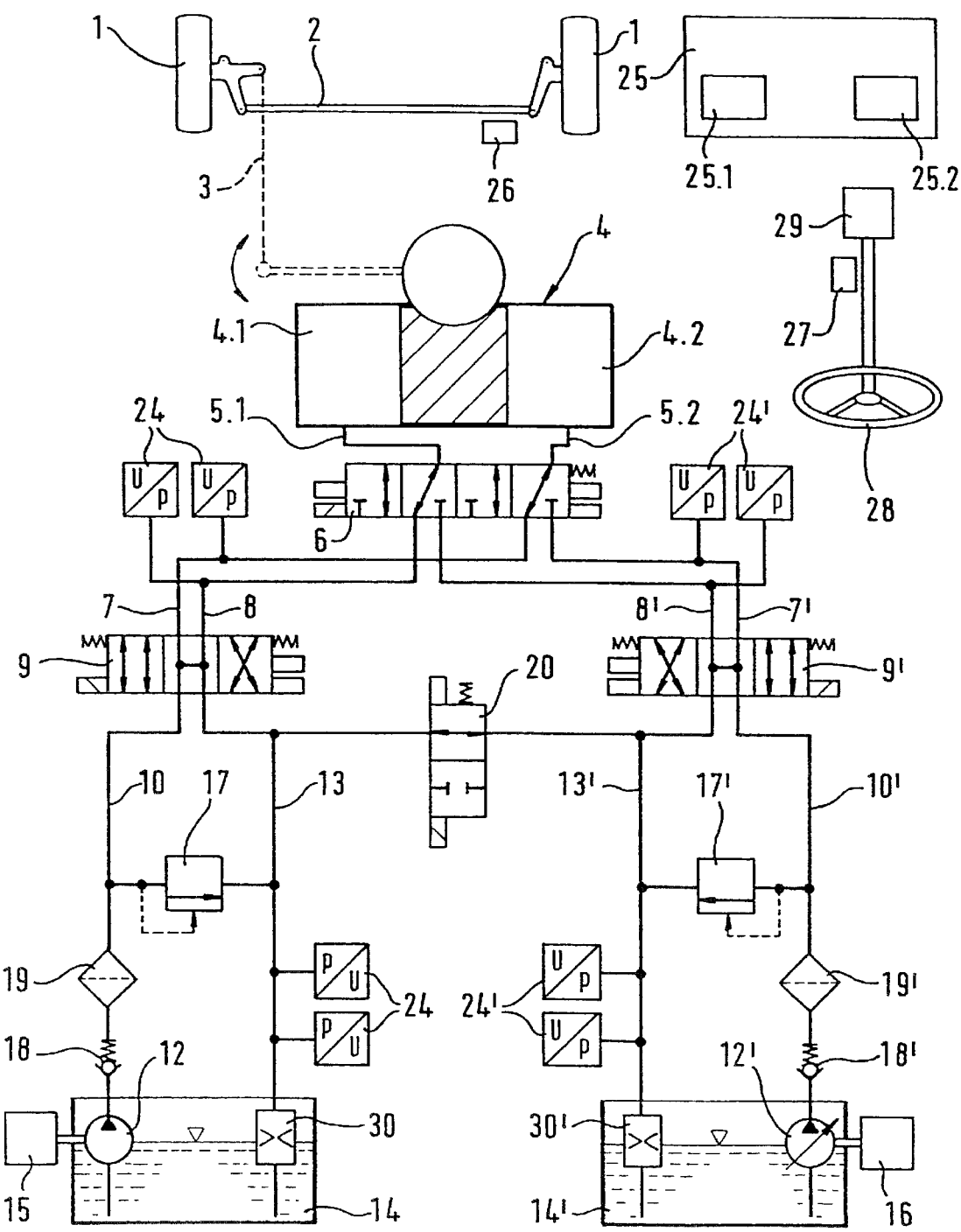
FIG. 2 is a corresponding schematic representation of a modified embodiment.

The embodiment of FIG. 2 differs from the embodiment of FIG. 1 essentially in that both reservoirs 14, 14' are always unpressurized. In order to now be able to also produce a certain excess pressure during the operation of the steering system in the return flow lines 13, 13' and thus be able to keep all connections of the servo valves 9, 9' under an excess pressure, throttles 30, 30' are each arranged at the mouths of the respective lines 13, 13' into the reservoirs 14, 14'. Furthermore, the reservoirs 14, 14' are constructed such that the pumps 9, 9' can definitely not take in air. For this purpose, the suction mouths of the pumps 9, 9' and of the associated suction pipes are arranged far below the level of the hydraulic medium in the reservoirs 14, 14'. The function of the system of FIG. 2 otherwise corresponds to the function of the system of FIG. 1.

In the opened condition of the embodiment of FIG. 2 during the steering operation, the shut-off valve 20 can, as a rule, not take over the function of compensating the hydraulic flow which can be caused by the parasitic coupling of the hydraulic circuits assigned to the pumps 12, 12' by the valve 6. For this reason, the valve 6 is closed during normal operation and is essentially opened only for service purposes. The valve 20 can optionally also be eliminated.

A compensation of the liquid quantities in the reservoirs 14, 14' can take place by an overflow line (not shown) whose mouths must, however, be arranged on the reservoirs 14, 14'. Thereby, in the event of leakage of a hydraulic circuit, the reservoir of the other hydraulic circuit cannot drain.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hydraulic power steering systems for non-tracked vehicles, comprising
    a driver-side operated steering handle;
    a double-acting hydraulic servo motor positively coupleable with steered vehicle wheels for their steering adjustment thereof;
    a motor-operated, servo valve arrangement operatively connectable by a pressure connection with the delivery side of a hydraulic pump, by way of a low-pressure connection lines with a suction side of the hydraulic pump or a hydraulic reservoir communicating with the suction side and, by way of two motor connections, with sides of the servo motor such that during pump operation control of a pressure difference between the motor connections with respect to extent and direction is permitted;
    an electronic automatic control arrangement having a desired steering angle value generator operated by the steering handle and an actual steering angle value generator operated by the steered vehicle wheels to control the servo valve arrangements as a function of a desired-actual value comparison; the servo valve arrangement and the pump forming at least two parallel hydraulic circuits;

a change-over valve arrangement separately connected with the hydraulic circuits and arranged between the hydraulic circuits and the servo motor to connect in any of positions thereof a different one of the at least two parallel hydraulic circuits with the servo motor and to shut off the other of the hydraulic circuits with respect to the servo motor;

an electronic monitoring device combined with a sensor system for monitoring the at least two parallel circuits separately from one another and detecting operating parameters of at least one of the hydraulic circuits and automatic control arrangement, so that in the event of disturbances in at least one of the hydraulic circuit connected with the servo motor and the control system of the control arrangement assigned thereto, the change-over valve arrangement is triggered to connect an undisturbed hydraulic circuit or a hydraulic circuit with an undisturbed control system with the servo motor.

2. The system according to claim 1, wherein each motor and the change-over valve arrangement are constructed as a unit which excludes leakage.

3. The system according to claim 1, wherein each respective hydraulic reservoir is a low-pressure container subjected to an excess pressure.

4. The system according to claim 3, wherein the servo motor and the change-over valve arrangement are constructed as a unit which excludes leakage.

5. The system according to claim 1, wherein a throttle is arranged in respective ones of the low pressure connection lines.

6. The system according to claim 1, wherein the hydraulic pump is automatically controlled and is driven by an uncontrolled drive.

7. The system according to claim 1, wherein a respective shut-off valve is arranged between the hydraulic reservoirs.

8. The system according to claim 1, wherein the electronic monitoring arrangement is integrated in the automatic control arrangement.

9. The system according to claim 1, wherein the servo valve arrangement has an open center.

10. The system according to claim 1, wherein a pressure accumulator is operatively arranged on the delivery side of at least one pump.

11. The system according to claim 1, wherein a shut-off valve is operatively arranged between the hydraulic circuits so as to be closable in the event of leakage in the hydraulic circuits and is one of either periodically or permanently opened during normal operation of the system.

* * * * *